UNITED STATES PATENT OFFICE.

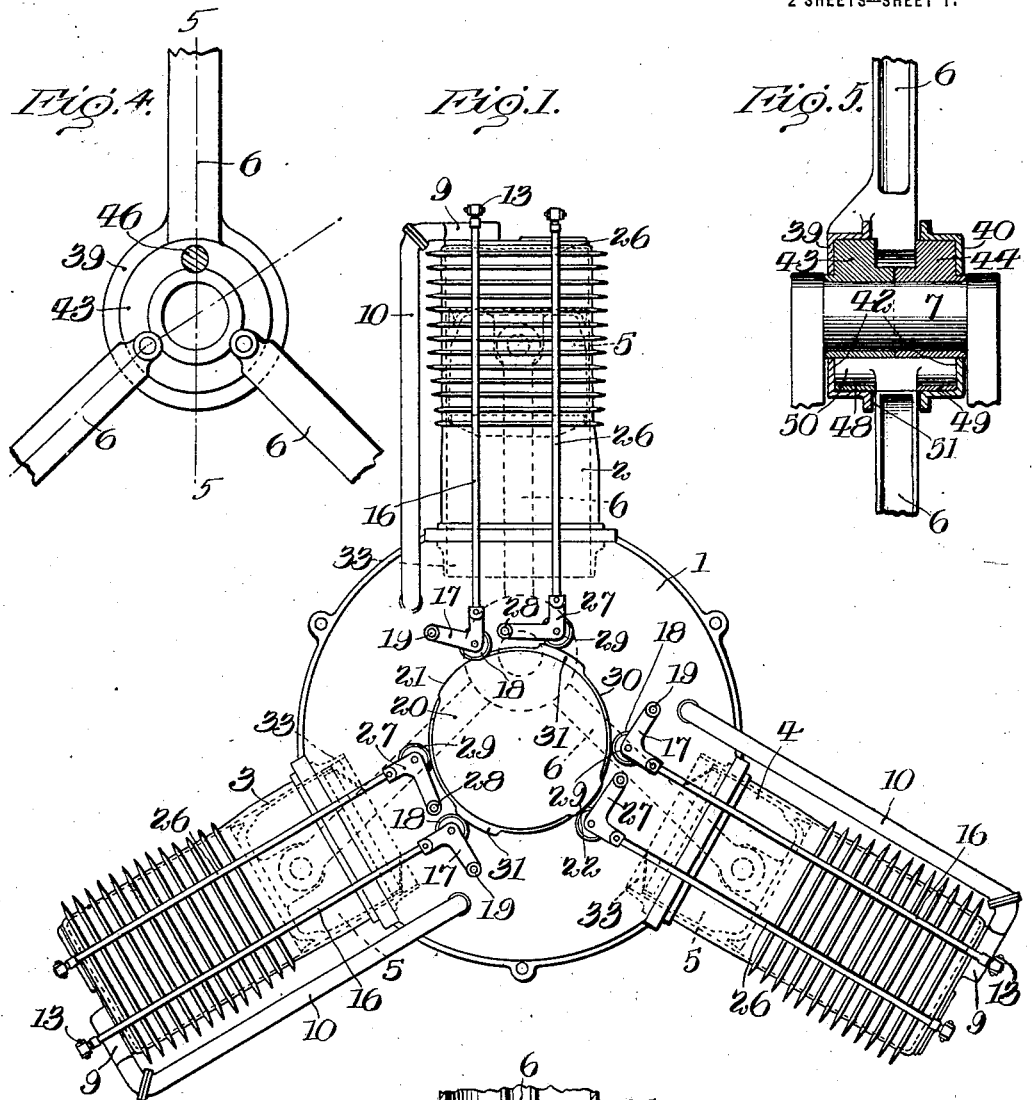
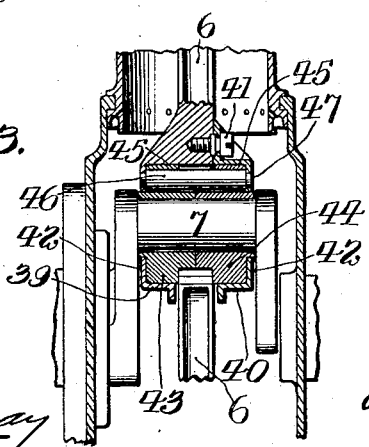

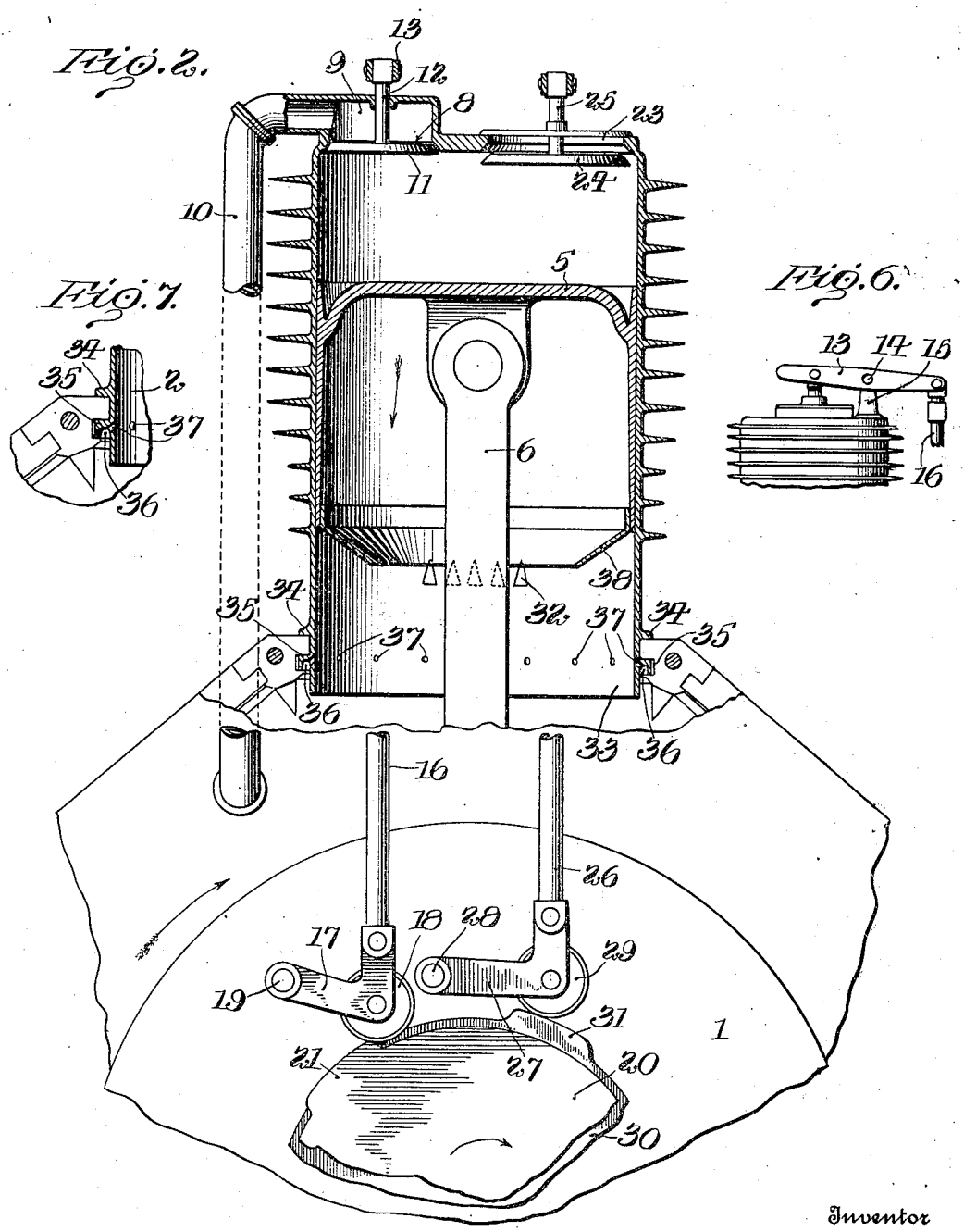

ROBERT S. MOORE, OF WASHINGTON, DISTRICT OF COLUMBIA, ASSIGNOR TO GYRO MOTOR COMPANY, OF WASHINGTON, DISTRICT OF COLUMBIA, A CORPORATION OF DELAWARE.

ROTARY GAS-ENGINE.

1,198,471.            Specification of Letters Patent.      Patented Sept. 19, 1916.

Application filed December 22, 1914. Serial No. 878,564.

*To all whom it may concern:*

Be it known that I, ROBERT S. MOORE, a citizen of the United States, residing at Washington, in the District of Columbia, have invented certain new and useful Improvements in Rotary Gas-Engines, of which the following is a description, reference being had to the accompanying drawing and to the figures of reference marked thereon.

The invention relates to new and useful improvements in gas engines, and more particularly to a gas engine of the rotary type, wherein there is a rotating casing which carries the cylinders.

An object of the invention is to provide a gas engine of the above type with means for permitting the free intake of air during a greater portion of the intake stroke of the piston, so that the piston may be moved during the intake stroke with a much smaller sacrifice of energy, and also operate to draw air into the cylinder simultaneously with the drawing in of the fuel gases.

A further object of the invention is to provide a gas engine of the above character wherein the exhaust valve may be held open during a greater portion of the intake stroke, to permit the free intake of air through the exhaust port at this time.

A further object of the invention is to provide means for facilitating the lubrication of the side walls of the cylinder, which are engaged by the piston.

A still further object of the invention is to provide a crank connection for the piston of the engine which shall be simple in construction and at the same time strong and durable.

These and other objects will in part be obvious, and will in part be hereinafter more fully described.

In the drawings, which show by way of illustration one embodiment of the invention, Figure 1 is an end view showing a rotary gas engine having my improvements applied thereto; Fig. 2 is an enlarged detail sectional view longitudinally of one of the cylinders, showing a portion of the crank casing; Fig. 3 is a detail in section through the casing and a portion of the cylinder and through the crank connection, showing the construction thereof; Fig. 4 is an enlarged detail in section showing the crank connection; Fig. 5 is a view on the line 5—5 of Fig. 4; Fig. 6 is a detail showing the end of the cylinder and the manner of mounting the levers for operating the valves; Fig. 7 is a detail in section showing the manner of lubricating the inner wall of the cylinder.

The invention consists generally in a gas engine having a rotating casing on which is mounted a plurality of cylinders. In each cylinder is a piston which reciprocates relative to said cylinder. The fuel gases are supplied to the cylinder through an intake port in the end of the same, and this intake port is controlled by a valve which is positively moved by cams as the engine rotates. Also in the end of the cylinder is an exhaust port through which the burnt gases are expelled. This exhaust port is controlled by a valve and the valve is likewise operated by a cam which rotates with the gas engine. The cam for operating the exhaust valve is so constructed as to hold this exhaust valve open during a greater portion of the intake stroke and this permits the piston to move relative to the cylinder with very little sacrifice of energy, as there will be very little vacuum formed in the cylinder as long as the exhaust valve is left open. It also permits air to be drawn into the cylinder with the fuel gases.

The invention consists further in providing ports extending through the lower end of the cylinder wall which projects into the case, so as to permit the lubricating oil to gather in a pocket outside of the cylinder wall and pass through said ports for lubricating the inner face of the cylinder which is engaged by the piston.

The invention also comprises a crank connection which consists of sectional rings having a bearing therein for the crank, which bearing also provides means for supporting and spacing the various crank connections.

Referring more in detail to the drawings, my improved engine consists of a casing 1, which is mounted to rotate on a fixed shaft, and this casing 1 carries a plurality of cylinders 2, 3 and 4. While I have shown three cylinders, it will be obvious that any number of cylinders may be employed, and that the present showing is purely for the purpose of illustrating one embodiment of the invention. In each cylinder there is a piston 5. This piston 5 is connected to a piston rod 6. The piston rods 6 of the various cylinders are connected with a crank 7 carried by the fixed shaft around which the casing rotates. The rotating casing, the cylinders and the pistons may be of the usual character, and further detail description thereof is not thought necessary.

The fuel gases are supplied to the cylinder through an intake port 8 in the outer end of the cylinder. This intake port is connected with a chamber 9, which in turn is connected through a pipe 10 with the crank casing, as herein shown. The fuel gases pass from the crank casing through this pipe 10, the chamber 9 and thence through the intake port 8 into the cylinder. This intake port is controlled by a valve 11, carried by a valve stem 12. The valve stem 12 is connected to a lever 13. The lever 13 is fulcrumed at 14 on a bracket 15 carried by the head of the cylinder. The opposite end of the lever is connected to a rod 16. This rod 16 is pivotally connected to a lever 17 carrying a roller 18. The lever is fulcrumed at 19 to the casing 1. The roller 18 coöperates with a cam 20, provided with two cam projections 21 and 22. Also located in the outer end of the cylinder is a main exhaust port 23. This main exhaust port is controlled by a valve 24 carried by a stem 25 pivoted to a lever similar to the lever 13 for the intake valve. This lever is connected at its outer end to a rod 26 and the rod 26 is in turn pivoted to a lever 27 fulcrumed at 28 on the crank casing 1 and carrying a roller 29. The roller 29 coöperates with a cam 30 having two cam projections 31. The cams 20 and 30 are mounted on the shaft around which the crank casing rotates, and these cams are driven by the usual differential driving mechanism which drives the cams at a speed slightly slower than the rotation of the crank casing, so the valves will be controlled in the proper timing in the different cylinders. This differential operating mechanism for the valve cams is of the usual structure, as above noted, and illustration thereof is not thought necessary. Each cylinder is also provided with a plurality of auxiliary exhaust ports 32, which may be of any desired number and are preferably triangular in shape, with the vertex of the triangle at the outer end thereof or projecting toward the head of the cylinder. As the piston moves downward, these auxiliary exhaust ports will be uncovered by the piston, and inasmuch as these openings are triangular in shape, they will be gradually opened, thus permitting the release of the gases gradually and thereby reducing the noise incident to the release of the expanding gases. These auxiliary exhaust ports are located a short distance above the extreme lower end of the stroke of the piston relative to the cylinder.

The cylinders project into the crank casing, as indicated at 33, and each cylinder is held in the crank casing by the spaced lugs 34 and 35. The lug 35 is formed with a pocket 36 on the inner face thereof. The lubricating oil in the crank casing is thrown against the outer wall of the crank casing and will accumulate in the pocket 36. The wall of the cylinder is provided with inclined ports 37, which lead from the pocket through the wall of the cylinder to the inner face thereof, so that the lubricating oil collecting in the pocket 36, will pass through the ports and lubricate the inner face of the cylinder with which the piston makes contact. The piston head is also provided with an oil guard 38, which directs the oil to the outer surface of the piston. Through these oil ports 37 and the oil guard 38, I am able to very effectively lubricate the inner surface of the cylinder.

The piston rods are connected to the crank 7 by my improved crank connection, which consists of two rings 39 and 40. The ring 39 is formed integral with the piston rod of the cylinder 2, while the ring 40 is secured to the piston rod by a clamping screw 41. Each ring at the outside edge thereof is extended inwardly to form a cap plate 42, through which there is an opening for the crank 7. Located within these rings is a bearing made in two sections 43 and 44. These bearings are preferably of bronze. The two sections are provided with registering openings 45, in which is located a pin 46. This pin 46 is reduced at its ends as at 47, and these reduced end sections 47 extend into openings in the cap plates 42. The purpose of this pin 46 and the connection between the same and the cap plates, is to hold the two sections of the bearing in a predetermined position relative to the rings 39 and 40 and the piston rod 6 of the cylinder 2. The bearing sections are also provided with openings 48 and 49 respectively, which receive the T-end 50 of the piston rods 6 of the other cylinders. These openings 48 and 49 are spaced so as to position the piston rods relative to the crank 7. The rings 39 and 40 are spaced as at 51, so as to permit the piston rods 6 to extend outwardly between said rings, and said piston rods are free from contact with said rings.

By the above construction, the various pistons are connected to the crank shaft 7 in proper spaced relation to each other. The sole wear of the piston rods is brought on to the bearing sections, while the bearing sections are held in place and strengthened by the rings 43 and 40 which surround the same in the direction of the thrust of the piston rods against the crank shaft. The only openings formed in the cap plates are the openings for the pin 46, and I am able, therefore, to make a very strong crank connection.

The operation of the engine will be now described, starting with the parts as positioned in Fig. 2. The piston 5 is just about to begin its downward stroke, and the valves are timed so that this is the intake stroke of the pistons. As the piston moves downward relative to the cylinder, the intake valve 11 will be opened, as the roller 18 is moving up on to the cam 21. The exhaust valve 24 is wide open as the roller 29 is on the cam 31 and is approaching the rear end of this cam projection. The down stroke of the piston, therefore, will draw in air through the exhaust port, and will draw in some little gas through the intake port. This opening of the exhaust port, which may be made large at the time that the piston is moving downward on a greater portion of its stroke, relieves the cylinder almost entirely from vacuum, and thus reduces the friction or the energy which is usually sacrificed on the intake stroke of the piston due to the forming of a vacuum in the cylinder. Air is being drawn into the cylinder, and a small proportion of fuel gas is being mixed with the air. The exhaust valve 24 will close when the roller 29 drops from the cam projection 21. This is timed so as to occur as the piston is reaching the lower end of its stroke, and as soon as this exhaust valve closes the suction will be increased, so as to draw in a larger proportion of fuel gas through the intake port. On the return stroke of the piston, the gases are compressed, both the valves 11 and 24 being closed, and after the gases are compressed, they are fired and on the expansion stroke the valves remain closed until after the piston has uncovered the auxiliary exhaust ports 52, permitting a preliminary relief of the expanded gases, after which the exhaust port is opened to permit the gases to be forced from the cylinder on the out stroke of the piston and the exhaust valve remains open through a portion of the next inward stroke of the piston which is the intake stroke first described.

From the above construction, it will be apparent that I have provided a rotary gas engine wherein the fuel gases are drawn into the cylinders by the suction stroke of the piston and during the suction stroke of the piston, the cylinder is open to the atmosphere during a greater portion of the stroke, which avoids friction and the sacrifice of energy during a greater portion of the intake stroke. It will also be apparent that I have provided a construction wherein the inner surface of the cylinder with which the piston head makes contact, is thoroughly lubricated. Furthermore, I have provided a construction for connecting the piston rods to the crank, which is very strong and durable, and in which all the wear is placed on bronze bushings.

It is obvious that minor changes in the details of construction and arrangement of parts may be made, without departing from the spirit of my invention, as set forth in the appended claims.

Having thus described my invention, what I claim as new and desire to secure by Letters Patent, is:

1. A gas engine including in combination a rotating casing, a cylinder carried thereby, a piston for said cylinder, an intake port and an exhaust port at the end of the cylinder, a valve for closing said intake port, a valve for closing said exhaust port, means for opening said intake port and holding the same open during substantially the entire intake stroke of the piston, means for opening the exhaust port prior to the beginning of the intake stroke and for holding the same open during a greater portion of the intake stroke, whereby a small proportion of fuel and a large proportion of air are drawn into said cylinder at the beginning and during the greater portion of the intake stroke and whereby fuel alone is drawn into said cylinder at the final portion of the intake stroke.

2. A gas engine including in combination, a rotating casing, a cylinder carried thereby, a piston for said cylinder, an intake port and an exhaust port in the end of the cylinder, a valve for closing said intake port, a valve for closing said exhaust port, auxiliary exhaust ports located adjacent the extreme inner stroke of the piston and uncovered by said piston, means for opening said intake port and holding the same open during substantially the entire intake stroke of the piston, means for opening the exhaust port prior to the beginning of the intake stroke and for holding the same open during a greater portion of the intake stroke whereby a small proportion of fuel and a large proportion of air are drawn into said cylinder at the beginning and during the greater portion of the intake stroke and whereby fuel alone is drawn into said cylinder at the final portion of the intake stroke.

3. A gas engine including in combination, a rotating casing, a cylinder carried thereby, a piston for said cylinder, said cylinder projecting into said casing and having a pocket surrounding the inner end thereof, and inclined ports leading from said pocket through the wall of the cylinder to the inner surface of the cylinder, whereby the lubricating oil collecting in said pocket may pass through said ports for lubricating the inner face of the cylinder.

In testimony whereof, I affix my signature in the presence of two witnesses.

ROBERT S. MOORE.

Witnesses:
A. M. PARKINS,
C. L. STURTEVANT